(12) United States Patent
Millikin et al.

(10) Patent No.: US 8,677,335 B1
(45) Date of Patent: Mar. 18, 2014

(54) PERFORMING ON-STACK REPLACEMENT FOR OUTERMOST LOOPS

(75) Inventors: Kevin Millikin, Lystrup (DK); Mads Sig Ager, Laasby (DK); Kasper Verdich Lund, Aarhus (DK); Florian Schneider, Aarhus (DK)

(73) Assignee: Google Inc., Mountain View, CA (US)

( * ) Notice: Subject to any disclaimer, the term of this patent is extended or adjusted under 35 U.S.C. 154(b) by 187 days.

(21) Appl. No.: 13/312,578

(22) Filed: Dec. 6, 2011

(51) Int. Cl.
*G06F 9/45* (2006.01)

(52) U.S. Cl.
USPC ........... 717/150; 717/151; 717/152; 717/158; 717/165

(58) Field of Classification Search
None
See application file for complete search history.

(56) References Cited

U.S. PATENT DOCUMENTS

| | | | |
|---|---|---|---|
| 7,552,428 B2* | 6/2009 | Stoodley et al. | 717/148 |
| 7,624,387 B2* | 11/2009 | Yoshida et al. | 717/152 |
| 8,087,010 B2* | 12/2011 | Eichenberger et al. | 717/150 |
| 8,356,165 B2* | 1/2013 | Tye et al. | 712/226 |
| 2004/0103401 A1* | 5/2004 | Chilimbi et al. | 717/130 |
| 2005/0251790 A1* | 11/2005 | Hundt | 717/130 |
| 2007/0150868 A1* | 6/2007 | Wu et al. | 717/124 |
| 2009/0235240 A1* | 9/2009 | Stoodley et al. | 717/148 |
| 2012/0167068 A1* | 6/2012 | Lin et al. | 717/160 |

OTHER PUBLICATIONS

Andereas Gal et al. "Trace-based Just-in-Time Type Specialization for Dynamic Languages", Jun. 15-20, 2009, pp. 1-15.*

* cited by examiner

*Primary Examiner* — Isaac Tecklu
(74) *Attorney, Agent, or Firm* — Sterne, Kessler, Goldstein & Fox PLLC

(57) ABSTRACT

Disclosed herein are methods and systems for using on stack replacement for optimization of software. A source code is compiled into an unoptimized code on a computing device. The unoptimized code is then executed on a computing device. A hot count is incremented. It is then determined whether a function within the unoptimized code is hot. If a function is determined to be hot, an OSR triggering code is inserted at a back edge of each loop within the function. The OSR triggering code is configured to trigger OSR at a loop depth that is less than the hot count.

30 Claims, 6 Drawing Sheets

PERFORMING ON-STACK REPLACEMENT FOR OUTERMOST LOOPS

BACKGROUND

1. Field

Embodiments relate to software optimization.

2. Background

On-stack replacement (OSR) is a technique for optimizing software code while the code is executing. In particular, OSR is used to optimize software functions that implement long running loops. Long running loops may not ever complete, or may take a long time to complete. Many types of software use such loops. For example, server daemons, graphics processing software, and programming language interpreters all typically use long running loops in their implementation. Typically, these types of software may include many different levels of loops, often referred to as nested loops. However, when software includes nested loops there is a bias towards performing OSR at inner loops instead of outer loops. This may harm the quality of the optimizations that OSR performs.

SUMMARY

In general, one aspect of the subject matter described in this specification can be implemented in methods that include the actions of compiling a source code into an unoptimized code on a computing device, executing the unoptimized code on a computing device, incrementing a hot count, determining whether a function within the unoptimized code is hot, and inserting an OSR triggering code at a back edge of each loop within the function if the function is hot, wherein the OSR triggering code is configured to trigger OSR at a loop depth that is less than the hot count.

Other implementations include corresponding systems, apparatus, and computer programs, configured to perform the actions of the methods, encoded on computer storage devices.

Further embodiments, features, and advantages of this invention, as well as the structure and operation and various embodiments of the invention, are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

While the present invention is described herein with reference to the illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
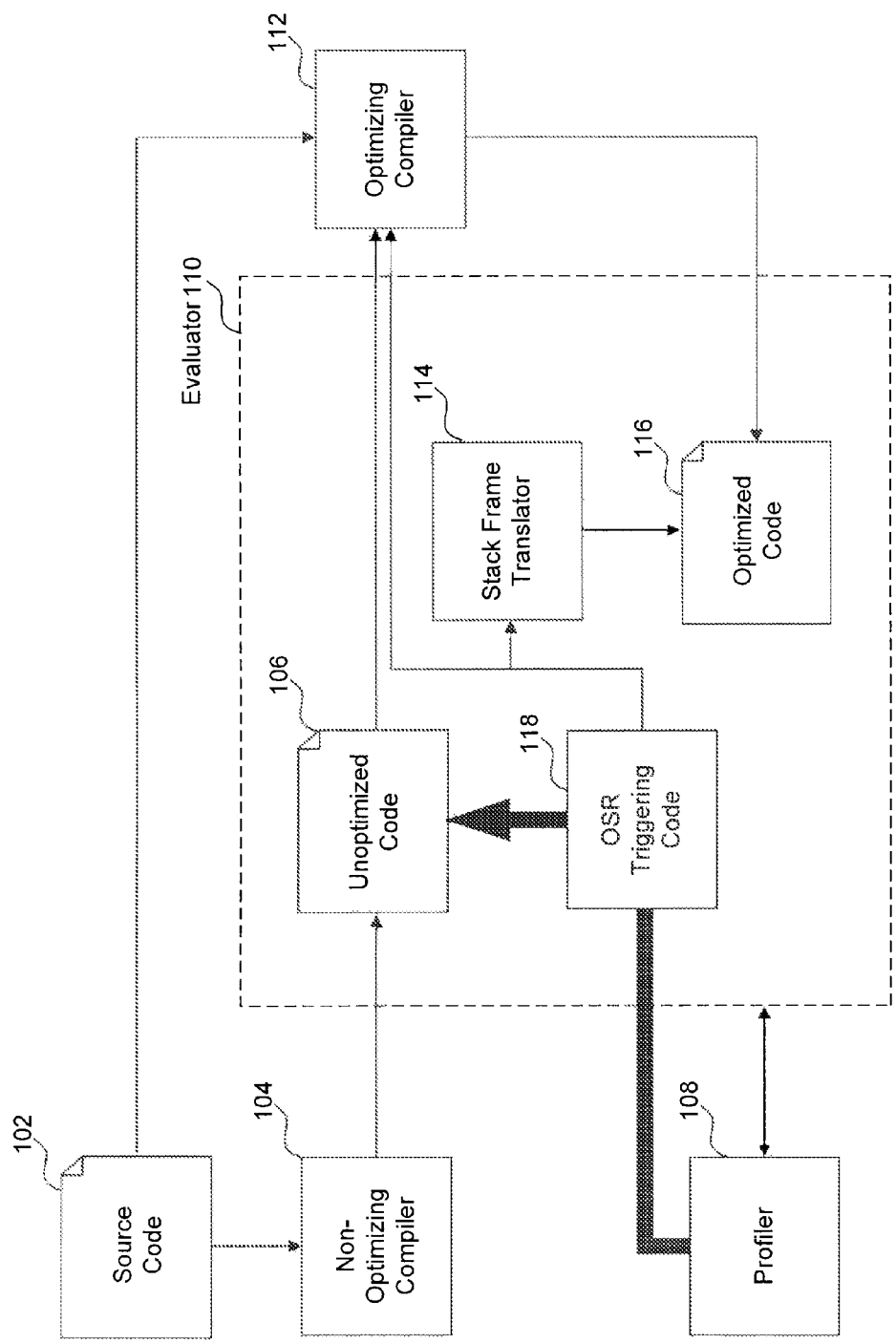
FIG. 1 is a block diagram of a system for optimizing software, according to an embodiment.

FIG. 1 is a block diagram of a system for optimizing software, according to an embodiment. System 100 includes source code 102. Source code 102 may be written in any programming language, for example the JAVASCRIPT, or C/C++ programming languages. Source code 102 may be processed by non-optimizing compiler 104. Non-optimizing compiler 104 may be configured to create unoptimized code 106 from source code 102. Non-optimizing compiler 104 may be further configured to mark the loop depth of each of the loops that occur within unoptimized code 106. In particular, each loop generated in unoptimized code 106 by non-optimizing compiler 104 may additionally be marked with an identifier storing the corresponding loop depth. However, according to an embodiment, the loop depth may instead be stored in a table. The table may then be accessed at a later time to determine the loop depth of each loop. The loop depth may start at zero for the outermost loop and increment by one for each successive nested loop within the outermost loop. For example, Table 1 shows an example function exhibiting multiple levels of loops:

TABLE 1

```
function example( ){
    for(i=0; i < L; ++i){ //Loop depth 0
        ...
        for(j=0; j < M; ++j){ //Loop depth 1
            ...
            for(k=0; k<N; ++k){ //Loop depth 2
            ...
            }
        }
    }
}
```

The outermost loop, may be marked at loop depth zero. Accordingly, non-optimizing compiler 104 may store an identifier, identifying the outermost loop as loop depth zero, within unoptimized code 106. The next inner loop or the middle loop may be marked as loop depth one and the innermost loop may be marked as loop depth two within unoptimized code 106. Thus, for each additional nested loop level the depth identifier is accordingly incremented by one.

Unoptimized code 106 may then be executed by evaluator 110. Evaluator 110 may be physical hardware, such as a computing device. Evaluator 110 may also be a programming language interpreter that is executed by hardware, such as a computing device. Alongside evaluator 110, profiler 108 may also be executing. Profiler 108 may be configured to determine which parts of unoptimized code 106 should be optimized. A function or a part of code that is executed frequently or occupies a lot of processor time may be referred to as "hot." Determining whether a particular piece of code or function is hot may be accomplished in a number of ways. For example, profiler 108 may determine which functions are hot by measuring the number of times they are called or the amount of time evaluator 110 spends executing them. If a function is determined to be hot, then the function may be a candidate for OSR. Profiler 108 may further be configured to keep a hot count (initialized to an initial value such as zero) of the number of times a function is determined to be hot. A separate hot count may be kept for each function within unoptimized code 106. For example, the first time profiler 108 determines a particular function is hot, the hot count may be one. The second time profiler 108 determines a particular function is hot, the hot count may be two. Every time thereafter, the hot count may be incremented by one if a function is determined to be hot by profiler 108.

Profiler 108 may enable OSR by inserting OSR triggering code 118 within the function considered hot in unoptimized code 106. In particular, profiler 108 may insert OSR triggering code 118 directly before the execution of each loop within the function. This point is often referred to as the back edge within a control flow graph. The back edge is the point in the execution of loop where the loop is reexecuted. However, OSR triggering code 118 may only trigger OSR in particular loops based upon the hot count. In particular, OSR triggering code 118 may trigger OSR at a loop with a loop depth that is less than the current hot count. Accordingly, if the hot count is one, then OSR triggering code 118 may trigger OSR at loop depth zero's back edge. For example, in the case of Table 1, OSR triggering code 118 may trigger OSR at the back edge of the outermost loop if the hot count is one. If the hot count is two, OSR triggering code 118 may trigger OSR at the back edge of the middle loop or of the outermost loop. If the hot count is three, OSR triggering code 118 may trigger OSR at the back edge of the innermost loop, the middle loop, or the outermost loop.

OSR triggering code 118 may be configured to cause execution to jump to optimized code 116, parts of optimized code 116, optimizing compiler 112, stack frame translator 114, or unoptimized code 106 depending on a number of factors. Optimizing compiler 112 may be configured to create optimized code 116. Optimized code 116 may be replacement code for an entire function or only parts of a function. Accordingly, the first time OSR triggering code 118 is executed, OSR triggering code 118 may be configured to switch execution to optimizing compiler 112 in order to first create optimized code 116. However, optimizing compiler 112 may be configured to take as an input information collected from profiler 108. Additionally, optimizing compiler 112 may take as an input source code 102, unoptimized code 106, or both. Optimizing compiler 112 may then use this information to generate optimized code 116. In some circumstances, however, profiler 108 may not have enough information to create optimized code 116. For example, evaluator 110 may not have been executing unoptimized code 106 long enough to generate sufficient profiling information. According to an embodiment, if the information available from profiler 108 is insufficient to create optimized code 116, then OSR triggering code 118 may be configured to jump back to unoptimized code 106 until enough information is collected to create optimized code 116.

After optimized code 116 has already been created, then OSR triggering code 118 may be configured to switch execution to optimized code 116. However, in some cases, the state of execution or the stack activation may need to be modified in order to support optimized code 116. For example, unoptimized code 106 may expect certain data structures and a certain organization of the call stack, while optimized code 116 may expect something different. In such a case, a stack frame translator 114 may first be called in order to translate the state such that optimized code 116 may execute properly.

OSR triggering code 118 may trigger OSR at the back edge of a loop at any depth within a function while the function is still executing. Accordingly, OSR triggering code 118 may be initially executed from any loop level within a function. For example, in the case of Table 1, depending on how many times the example function has been determined to be hot, OSR triggering code 118 may be executed from any of the loops within the example function. However, the function within unoptimized code 106 has not concluded execution, even though OSR triggering code 118 has been called. Accordingly, when optimized code 116 is executed, execution must continue at a point from within optimized code 116 that corresponds to the last instruction executed within unoptimized code 106. For example, if OSR triggering code 118 is executed from the back edge of innermost loop (loop depth two) of Table 1, then execution must continue at the corresponding loop within optimized code 116. However, depending on how optimizing compiler 112 creates optimized code 116, the innermost loop of optimized code 116 may be very different from the innermost loop of unoptimized code 106. Thus, the corresponding loop represents the place in execution of optimized code 116, where optimized code 116 has the same state as unoptimized code 106. A table may be created by optimizing compiler 112 that correlates the back edge of each loop at each depth with an address offset or a full address in optimized code 116. Additionally, the non-optimizing compiler 104 may create a table that correlates the back edge of each loop at each depth with an address offset or a full address in unoptimized code 106. When OSR triggering code 118 must execute at a particular loop within optimized code 116, OSR triggering code 118 may consult each of the tables to determine the address of the corresponding loop, and switch execution to that loop. Moreover, as discussed previously, the state may need to be translated in order to support optimized code 116. Accordingly, prior to executing optimized code 116 at a particular loop, the state from unoptimized code 106 may be converted using stack frame translator 114 such that optimized code 116 may continue to execute properly at the particular loop.

Figure 2:
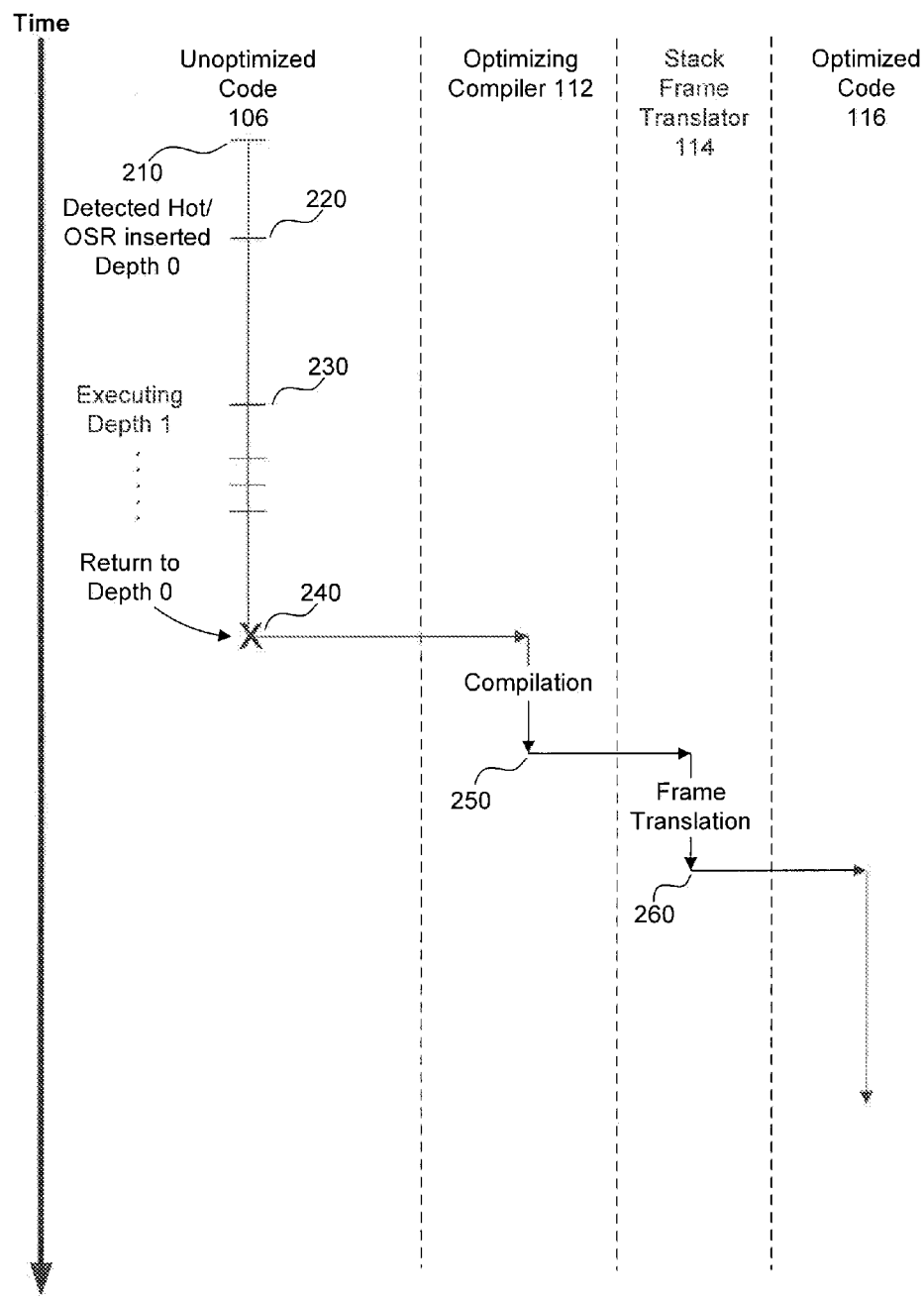
FIG. 2 depicts an execution timeline of on-stack replacement for an example function, according to an embodiment.

FIG. 2 depicts an execution timeline of on-stack replacement for an example function, according to an embodiment. At event 210, unoptimized code 106 is executed. For example, evaluator 110 may execute unoptimized code 106. According to an embodiment, unoptimized code 106, when executed, may be a programming language interpreter. Unoptimized code 106 may be compiled from source code, such as source code 102, using a non-optimizing compiler, such as non-optimizing compiler 104. The loop depths of loops within unoptimized code 106 may also be marked with identifier inserted within unoptimized code 106. Several nested levels of loops may be executing within unoptimized code 106. For example, the code of Table 1 has three loops at three depths of, zero, one, and two.

At event 220, a function within unoptimized code 106 is detected to be hot. The function may be detected to be hot by a profiler, such as profiler 108. A function or a part of code that is executed frequently or occupies a lot of processor time may be referred to as "hot." Determining whether a particular piece of code or function is hot may be accomplished in a number of ways. For example, the profiler may determine which functions are hot by measuring the number of times they are called or the amount of time the evaluator spends executing them. If a function is determined to be hot, then the function may be a candidate for OSR. Accordingly, OSR triggering code, such as OSR triggering code 118, may be inserted at the back edges of all loops within the function. The particular loop that the OSR triggering code may trigger OSR from may depend on the number of times the function has been determined to be hot. In particular, a hot count kept within the profiler, initialized to zero, may be incremented each time a function is determined to be hot. The OSR triggering code may then trigger OSR at a loop with a loop depth that is less than the current hot count. For example, if the hot count is one, then the OSR triggering code may trigger OSR at the back edge of the loop at loop depth zero. If the hot count is two, the OSR triggering code may trigger OSR at loop depth one or zero. At event 220, however, the function has been determined to be hot for the first time. Thus, the hot count is incremented from zero to one, and the OSR triggering code may trigger OSR only at the back edge of the loop at loop depth zero, or in the case of Table 1, the outermost loop.

At event 230, the function is still executing at loop depth 1. For example, the middle loop of Table 1 may still be executing. However, at event 220, the OSR triggering code may only permit OSR to execute at the outermost loop. In some cases, there may be several nested loops within a function. For example, the code in Table 1 has three loops. In such a case, the inner loops must finish execution before execution returns to the outermost loop's back edge where OSR is permitted to be executed. As a result, as of event 230, OSR may not have been executed yet.

At event 240, however, execution has returned to loop depth zero. Accordingly, the back edge at loop depth zero has been reached. For example, the innermost loop and the middle loop of Table 1 may have finished execution and the execution has returned to the outermost loop. Thus, the OSR triggering code inserted at event 220 to the back edge of the outermost loop may execute OSR, since the hot count is one and the outermost loop has a depth of zero. As discussed above, OSR triggering code may be configured to cause execution to jump to different areas depending on the circumstances. For example, the OSR triggering code may be configured to cause execution to jump to optimized code 116, parts of optimized code 116, optimizing compiler 112, stack frame translator 114, or unoptimized code 106. However, at event 240, the optimized code 116 may not have been generated yet, thus, optimizing compiler 112 must be executed in order to generate optimized code 116.

At event 250, optimizing compiler 112 has completed compilation and created optimized code 116. Stack frame translator may then begin translating the state of unoptimized code 106 into a state that is compatible with optimized code 116. In some cases, the state of execution may need to be modified in order to support optimized code 116. For example, unoptimized code 106 may expect certain variable types and a certain organization of the call stack, while optimized code 116 may expect something different. In such a case, a stack frame translator 114 may first be called in order to translate the state such that optimized code 116 may execute properly. After the state translation has completed, at event 260, optimized code 116 may be executed.

Figure 3:
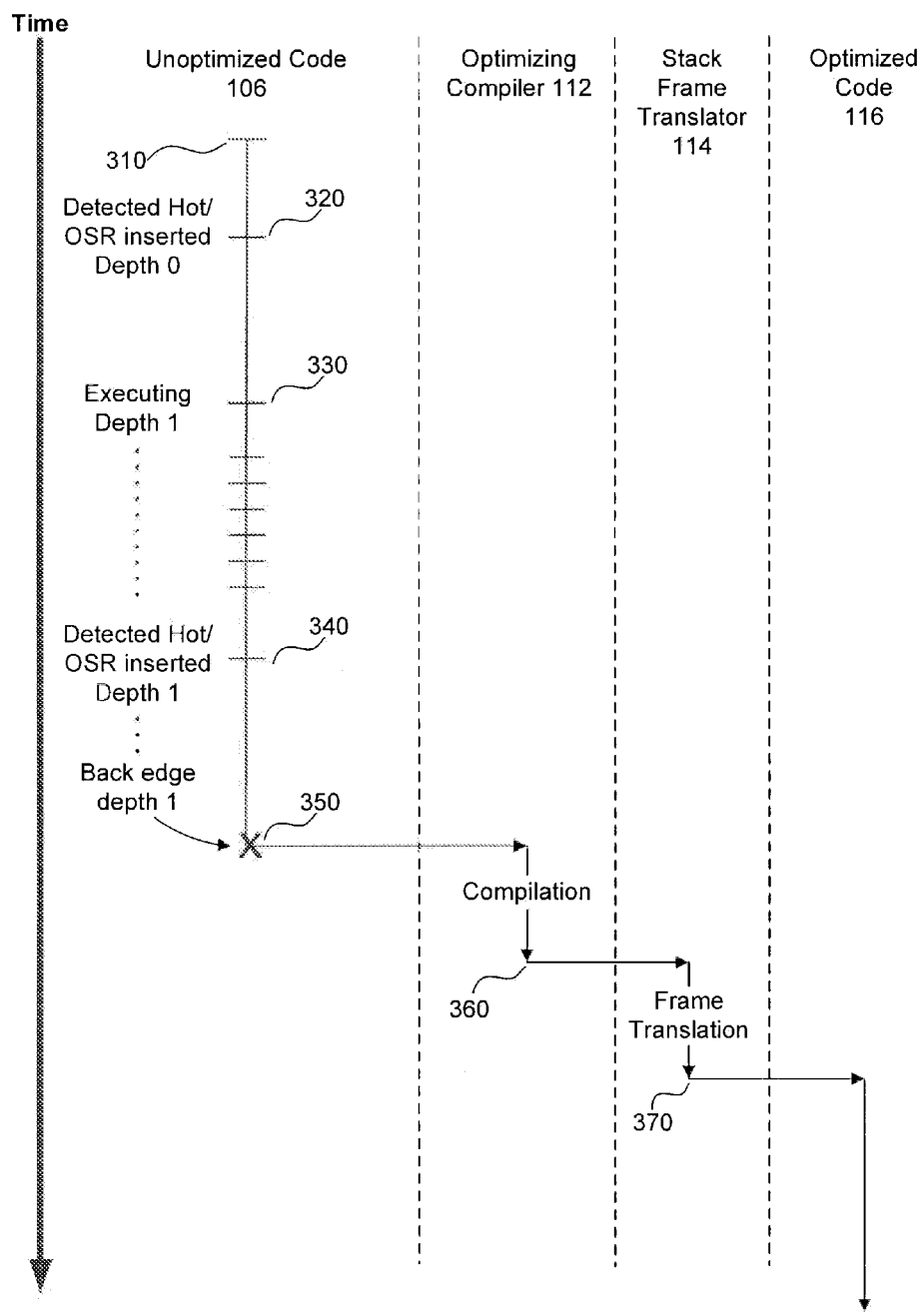
FIG. 3 depicts an example execution timeline of on-stack replacement for a function determined to be hot more than once, according to an embodiment.

FIG. 3 depicts an example execution timeline of on-stack replacement for a function determined to be hot more than once, according to an embodiment. At event 310, unoptimized code 106 is executed. For example, evaluator 110 may execute unoptimized code 106. According to an embodiment, unoptimized code 106, when executed, may be a programming language interpreter. Unoptimized code 106 may be compiled from source code, such as source code 102, using a non-optimizing compiler, such as non-optimizing compiler 104. The loop depths of loops within unoptimized code 106 may also be marked with identifier inserted in unoptimized code 106. Several nested levels of loops may be executing within unoptimized code 106. For example, the code of Table 1 has three loops, at three depths of, zero, one, and two.

At event 320, a function within unoptimized code 106 is detected to be hot. The function may be detected to be hot by a profiler, such as profiler 108. Accordingly, OSR triggering code, such as OSR triggering code 118, may be at the back edges of all loop within the function. The particular loop that the OSR triggering code may enable OSR at may depend on the number of times the function has been determined to be hot. In particular, a hot count kept within the unoptimized code, initialized to zero, may be incremented after each time a function is determined to be hot. The OSR triggering code may then trigger OSR at a loop with a loop depth that is less than to the current hot count.

Accordingly, at event 320, the function has been determined to be hot for the first time. Thus, the hot count is incremented from zero to one and the OSR triggering code may only enable OSR at the back edge of the loop at loop depth zero, or in the case of Table 1, the outermost loop.

At event 330, the function is still executing at loop depth 1. For example, the middle loop of Table 1 may still be executing. However, at event 320, the OSR triggering code may only permit OSR to execute at the outermost loop. In some cases, there may be several nested loops within a function. In such cases, the inner loops must finish execution before execution returns to the outermost loop's back edge where OSR is permitted to be executed. As a result, as of event 330, OSR may not have been executed yet.

At event 340, the function has been detected to be hot again. Accordingly, the hot count may be incremented. Since the hot count was previously one, in the case of event 340, the hot count may then be incremented to two. The OSR triggering code may then be permitted to enable OSR at loop depth one. For example, in the case of Table 1, this may be the middle loop. Thus, the OSR triggering code may now execute OSR at either the back edge of the loop depth zero or loop depth one. For example, in the case of Table 1, the OSR triggering code may execute OSR at either the outermost loop or the middle loop. However, at event 330, execution was still continuing within the loop at loop depth one, for example the middle loop of Table 1.

At event 350, the back edge of loop depth one has been encountered. Thus, the OSR triggering code at the back edge of the loop at depth one may execute OSR. However, the OSR triggering code may also have been inserted at loop depth zero. For example, the OSR triggering code may have been inserted at event 320. Therefore, the OSR triggering code may be executed by either reaching the back edge of loop depth zero or loop depth one. For example, in the case of Table 1, instead of the middle loop reaching its back edge and executing the OSR triggering code, the middle loop may return to the outermost loop. In such a case, the OSR triggering code may also execute OSR at the back edge of the outermost loop. Thus, the OSR triggering code may execute OSR at the back edge of the outermost loop instead of the back edge of the middle loop.

As discussed above, OSR triggering code may be configured to cause execution to jump to different areas depending on the circumstances. For example, the OSR triggering code may be configured to cause execution to jump to optimized code 116, parts of optimized code 116, optimizing compiler 112, stack frame translator 114, or unoptimized code 106.

However, at event 350, the optimized code 116 may not have been generated yet, thus, optimizing compiler 112 must be executed in order to generate optimized code 116.

At event 360, optimizing compiler 112 has completed compilation and created optimized code 116. Stack frame translator may then begin translating the state of unoptimized code 106 into a state that is compatible with optimized code 116. In some cases, the state of execution may need to be modified in order to support optimized code 116.

At event 370, optimized code 116 may be executed. However, at event 350, unoptimized code 106 may still be executing within the loop at loop depth one. Accordingly, when the optimized code 116 is executed, execution must continue from a point within optimized code 116 that corresponds to the last instruction executed within unoptimized code 106. For example, if the OSR triggering code is executed from the back edge of the middle loop (loop depth 1) of Table 1, then execution must continue at the corresponding loop within optimized code 116. However, depending on how optimizing compiler 112 creates optimized code 116, the middle loop of optimized code 116 may be very different from the middle loop of unoptimized code 106. Thus, the corresponding loop represents the place in execution of optimized code 116, where optimized code 116 has the same state as unoptimized code 106. A table may be created by optimizing compiler 112 that correlates the back edge of each loop at each depth with an address offset or full address in optimized code 116. Additionally, the non-optimizing compiler 104 may create a table that correlates the back edge of each loop at each depth with an address offset or a full address in unoptimized code 106. When the OSR triggering code must execute at a particular loop within optimized code 116, the OSR triggering code may consult each of the tables to determine the address of the corresponding loop, and switch execution to that loop. Moreover, as discussed previously, the state may need to be translated in order to support the optimized code 116. Accordingly, prior to executing optimized code 116 at a particular loop, the state from unoptimized code 106 may be converted using stack frame translator 114 such that optimized code 116 may continue to execute properly at the particular loop. After the state translation has completed, at event 370, optimized code 116 may be executed.

Figure 4:
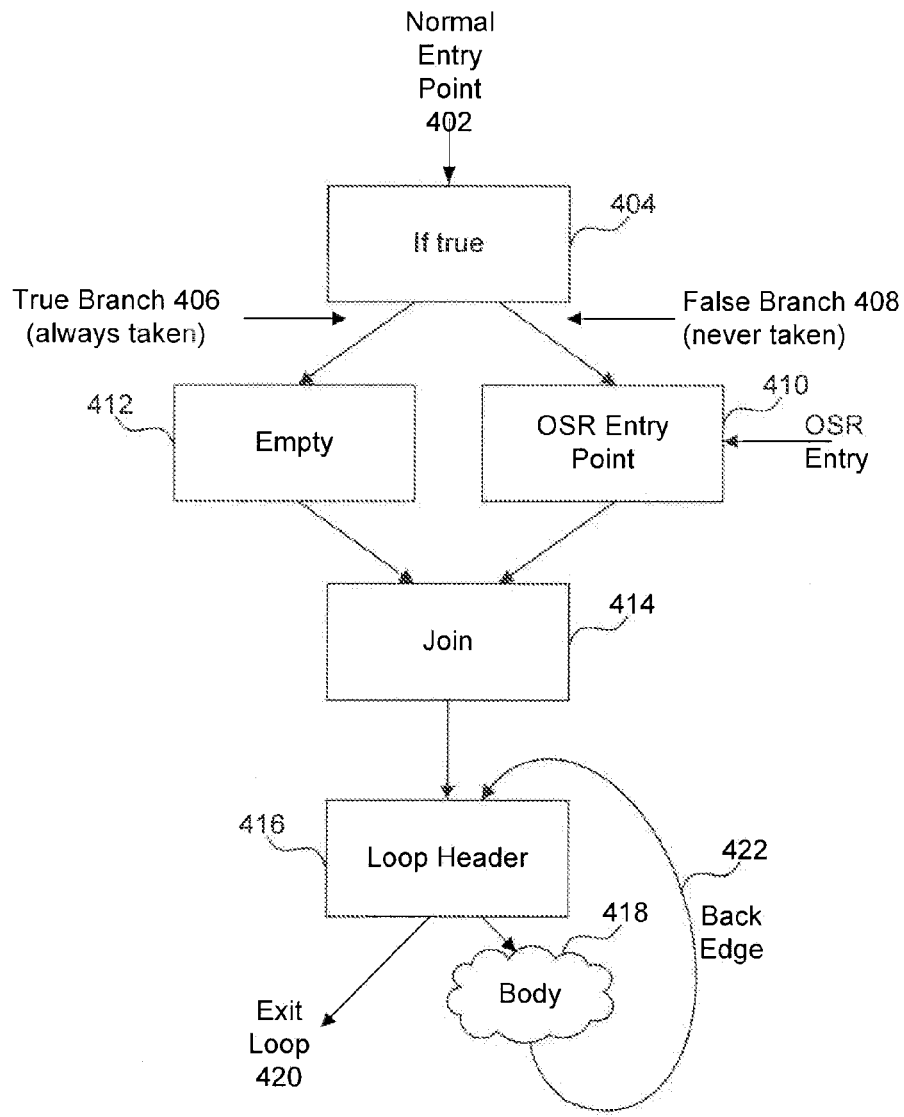
FIG. 4 depicts a control flow graph for OSR triggering code leading into an optimized loop, according to an embodiment.

FIG. 4 depicts a control flow graph for OSR triggering code leading into an optimized loop, according to an embodiment. A control flow graph is a representation of the flow of execution of software. As discussed above, the optimized code, such as optimized code 116, may be executed in several different ways. For example, the first time the optimized code is executed, the optimized code may be entered from an optimizing compiler, such as optimizing compiler 112. Thereafter, the optimized code may be executed directly. Accordingly, control flow graph 400 includes OSR entry point 410 and normal entry point 402. OSR entry point 410 may be the entry point from the optimizing compiler. Normal entry point may be the entry point for all other executions, thereafter.

The state of the unoptimized code may not be compatible with the state required to execute the optimized code. For example, unoptimized code 106 may expect certain variable types and a certain organization of the call stack, while optimized code 116 may expect something different. Moreover, immediately after the unoptimized code has been optimized the state may still reflect the state of unoptimized code. Thus, entry to the optimized code immediately after optimization may need to be handled separately from normal entry to the optimized code. In particular, OSR entry point 410 may be an entry point for the optimized code where the state may still be from the unoptimized code. At OSR entry point 410, the state may be translated from the unoptimized code to the optimized code. In particular, a stack frame translator, such as stack frame translator 114, may translate the state from unoptimized code by merging and converting data types to be compatible with the optimized code.

Control flow graph 400 includes branch 404 prior to OSR entry point 410. Branch 404 may be configured such that only one outgoing path is always taken. In particular, branch 404 may be configured with a condition that is always true. Accordingly, true branch 406 may always be taken by the control flow and false branch 408 may never be taken. True branch 406 may then lead into an empty block 412, wherein no operation is performed. Empty block 412, and thus the path leading from true branch 406 and normal entry point 402 may then lead into a join 414. Accordingly, control may flow from normal entry point 402 to join 414. Also leading into join 414 may be the control flow from OSR entry point 410. Join 414 may be configured to merge control flow from OSR entry point 410 and empty block 412. When merging the control flow within join 414, the normal optimized control flow path is biased.

The control flow successor of join 414 is loop header 416. Loop header 416 flows either to the loop body 418 or exit loop 420. Once the loop has completed, control may flow through exit loop 420. However, while the loop is still executing, control may flow through loop body 418, and back to loop header 416 via back edge 422, until the loop may be complete.

Figure 5:
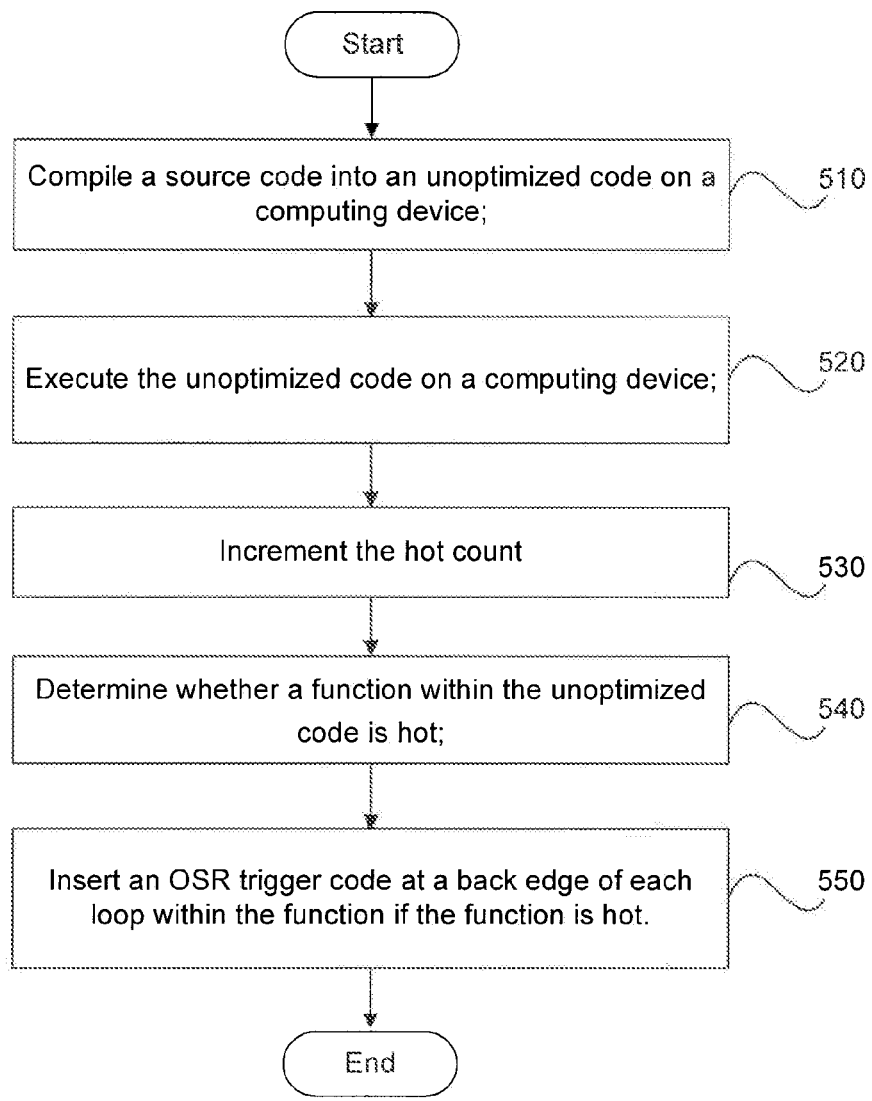
FIG. 5 depicts a method for enabling on stack replacement in software, according to an embodiment.

FIG. 5 depicts a method for enabling on stack replacement in software, according to an embodiment.

At block 510 of method 500, a source code is compiled into an unoptimized code on a computing device. The source code may be compiled in a non-optimizing compiler, such as non-optimizing compiler 104. The non-optimizing compiler may mark the loop depth of each of the loops that occur within the unoptimized code. In particular, each loop generated in the unoptimized code by the non-optimizing compiler may additionally be marked with an identifier storing the corresponding loop depth. The loop depth may start at zero for the outermost loop and increment by one for each successive nested loop within the outermost loop. However, according to an embodiment, the loop depth may instead be stored in a table. The table may then be accessed at a later time to determine the loop depth of each loop.

At block 520, the unoptimized code may be executed on a computing device. In particular, the unoptimized code may be executed by evaluator, such as evaluator 110. The evaluator may be physical hardware, such as a computing device. The evaluator may also be a programming language interpreter that is executed by hardware, such as a computing device.

At block 530, the hot count is incremented. Alongside the evaluator, a profiler may also be executing, such as profiler 108. The profiler may determine which parts of the unoptimized code should be optimized. A function or a part of code that is executed frequently or occupies a lot of processor time may be referred to as "hot." The profiler may keep track of the number of times a function is determined to be hot in a hot count. The hot count may initially be set to zero. Each time the function is considered to be hot, thereafter, the hot count may be incremented by one.

At block 540, whether a function within the unoptimized code is hot is determined. Determining whether a particular piece of code or function is hot may be accomplished in a number of ways. For example, a profiler, such as profiler 108, may determine which functions are hot by measuring the number of times they are called or the amount of time the evaluator spends executing them. If a function is determined to be hot, then the function may be a candidate for OSR.

At block 550, OSR triggering code is inserted at a back edge of each loop within the function. OSR may be enabled by inserting the OSR triggering code, such as OSR triggering code 118, within the function considered hot in the unoptimized code. In particular, a profiler, such as profiler 108, may insert the OSR triggering code at the back edge of each loop within the function. However, the OSR triggering code may only trigger OSR in particular loops based upon the hot count. In particular, the OSR triggering code may trigger OSR at a loop with a loop depth that is less than the current hot count.

The OSR triggering code may be configured to cause execution to jump to the optimized code, parts of the optimized code, the optimizing compiler, the stack frame translator, or the unoptimized code depending on a number of factors. An optimizing compiler, such as optimizing compiler 112, may be configured to create optimized code, such as optimized code 116. The optimized code may be replacement code for an entire function or only parts of a function. Accordingly, the first time the OSR triggering code is executed, the OSR triggering code may execute the optimizing compiler in order to first create the optimized code. However, the optimizing compiler may be configured to take as an input information collected from the profiler. Additionally, the optimizing compiler may take as an input the source code, the unoptimized code, or both. The optimizing compiler may then use this information to generate the optimized code. In some circumstances, however, the profiler may not have enough information to create the optimized code. According to an embodiment, if the information available from the profiler is insufficient to create the optimized code, then the OSR triggering code may be configured to jump back to the unoptimized code until enough information is collected to create the optimized code.

After the optimized code has already been created, then the OSR triggering code may be configured to switch execution to the optimized code. However, in some cases, the state of execution or the stack activation may need to be modified in order to support the optimized code. In such a case, a stack frame translator, such as stack frame translator 114, may first be called in order to translate the state such that the optimized code may execute properly.

The OSR triggering code may trigger OSR at the back edge of a loop at any depth within a function while the function is still executing. Accordingly, the OSR triggering code may be initially executed from any loop depth within a function. However, the function within the unoptimized code has not concluded execution, even though the OSR triggering code has been called. Accordingly, when the optimized code is executed, execution must continue at a point from within the optimized code that corresponds to the last instruction executed within the unoptimized code. A table may be created by the optimizing compiler that correlates the back edge of each loop at each depth with an address offset or full address in the optimized code. Additionally, the non-optimizing compiler may create a table that correlates the back edge of each loop at each depth with an address offset or a full address in unoptimized code. When the OSR triggering code must execute at a particular loop within the optimized code, the OSR triggering code may consult each of the tables to determine the address of the corresponding loop, and switch execution to that loop. Moreover, as discussed previously, the state may need to be translated in order to support the optimized code. Accordingly, prior to executing the optimized code at a particular loop, the state from the unoptimized code may be converted using a stack frame translator, such as stack frame translator 114, such that the optimized code may continue to execute properly at the particular loop.

Figure 6:
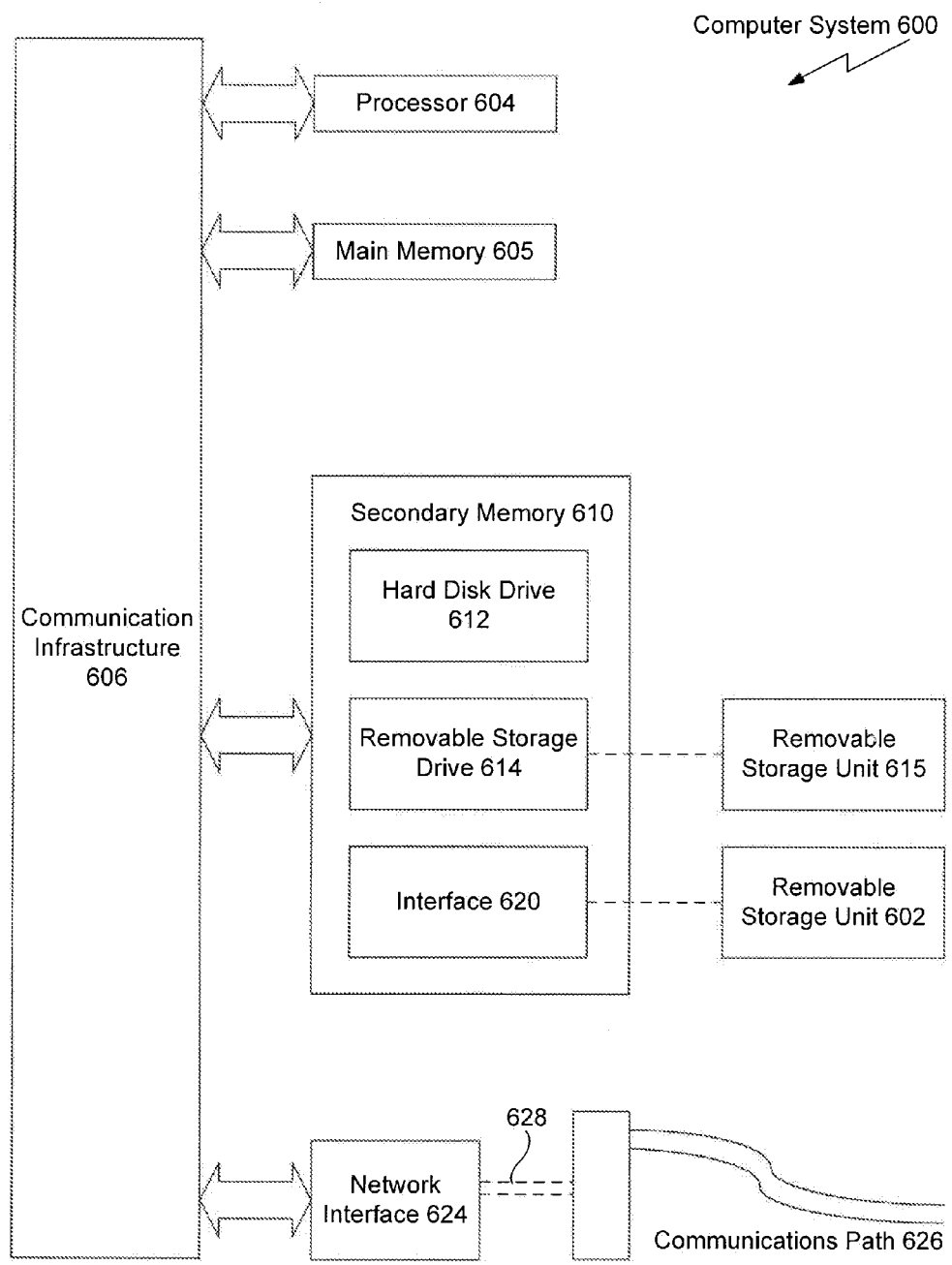
FIG. 6 illustrates an example computer system in which embodiments as described above, or portions thereof, may be implemented.

FIG. 6 illustrates an example computer system 600 in which embodiments as described above, or portions thereof, may be implemented. For example, system 100, including portions thereof, may be implemented in computer system 600 using hardware, software, firmware, tangible computer readable media having instructions stored thereon, or a combination thereof and may be implemented in one or more computer systems or other processing systems. Hardware, software, or any combination of such may embody any of the modules, procedures, and components in FIGS. 1-5.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 600. After reading this description, it will become apparent to a person skilled in the relevant art how to implement embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 604 may also be a single processor in a multi-core/multiprocessor system, such system operating alone, or in a cluster of computing devices operating in a cluster or server farm. Processor device 604 is connected to a communication infrastructure 606, for example, a bus, message queue, network, or multi-core message-passing scheme.

Computer system 600 also includes a main memory 608, for example, random access memory (RAM), and may also include a secondary memory 610. Secondary memory 610 may include, for example, a hard disk drive 612 and removable storage drive 614. Removable storage drive 614 may include a floppy disk drive, a magnetic tape drive, an optical disk drive, a flash memory, or the like. The removable storage drive 614 reads from and/or writes to a removable storage unit 618 in a well-known manner. Removable storage unit 618 may include a floppy disk, magnetic tape, optical disk, etc. which is read by and written to by removable storage drive 614. As will be appreciated by persons skilled in the relevant art, removable storage unit 618 includes a computer readable storage medium having stored thereon computer software and/or data.

Computer system 600 (optionally) includes a display interface 602 (which can include input and output devices such as keyboards, mice, etc.) that forwards graphics, text, and other data from communication infrastructure 606 (or from a frame buffer not shown) for display on display unit 630.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 may be in the form of signals, which may be electronic, electromagnetic, optical, or other signals capable of being received by communications interface 624. These signals may be provided to communications interface 624 via a communications path 626. Communications path 626 carries signals and may be implemented using wire or cable, fiber optics, a phone line, a cellular phone link, an RF link or other communications channels.

Some embodiments may be directed to computer products comprising software stored on any computer readable medium. Such software, when executed in one or more data processing devices, causes a data processing device(s) to operate as described herein.

Certain embodiments may be implemented in hardware, software, firmware, or a combination thereof. Some embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A computer-implemented method for optimizing software code comprising:
    compiling a source code into an unoptimized code on a computing device;
    executing the unoptimized code on a computing device;
    incrementing a hot count;
    determining whether a function within the unoptimized code is hot; and
    inserting an on-stack-replacement (OSR) triggering code at a back edge of each loop within the function if the function is hot, wherein the OSR triggering code is configured to trigger OSR at a loop depth that is less than the hot count.

2. The computer-implemented method of claim 1, further comprising:
    determining the loop depth of one or more loops within the unoptimized code; and
    inserting an identifier in the unoptimized code identifying the loop depth of each of the one or more loops within unoptimized code.

3. The computer-implemented method of claim 1, further comprising:
    determining the loop depth of one or more loops within the unoptimized code; and
    creating a table that corresponds each of the one or more loops with a corresponding loop depth of each of the one or more loops.

4. The computer-implemented method of claim 1, wherein the OSR trigger code is configured to:
    execute an optimizing compiler on the computing device, wherein the optimizing compiler creates optimized code for the function from the unoptimized code and the source code; and
    enter the optimized code on the computing device.

5. The computer-implemented method of claim 4, wherein the OSR trigger code is configured to:
    execute an optimizing compiler on the computing device, wherein the optimizing compiler creates optimized code for the function from the unoptimized code and the source code; and
    enter from a point within the optimized code that corresponds to the back edge of the loop where the OSR triggering code was executed.

6. The computer-implemented method of claim 4, wherein the OSR triggering code is further configured to:
    translate the state from the execution of unoptimized code into a state that permits the optimized code to execute correctly.

7. The computer-implemented method of claim 4, wherein the optimizing compiler takes as an input profiling information collected during the execution of the unoptimized code.

8. The computer-implemented method of claim 7, wherein the OSR triggering code is further configured to:
    execute the unoptimized code on the computing device, if the profiling information is insufficient to generate optimized code from the optimizing compiler; and
    execute the optimized code on the computing device, after the profiling information is sufficient to generate optimized code from the optimizing compiler.

9. The computer-implemented method of claim 1, wherein the unoptimized code is executed in an interpreter.

10. The computer-implemented method of claim 1, wherein the source code comprises scripting language instructions.

11. A system for optimizing software comprising:
    one or more processors;
    a source code, wherein the source code contains programming instructions;
    a non-optimizing compiler configured to:
        compile the source code into an unoptimized code using the one or more processors;

an evaluator configured to execute the unoptimized code using the one or more processors; and a profiler configured to:
increment a hot count using the one or more processors,
determine whether a function within the unoptimized code is hot,
insert an on-stack replacement OSR) triggering code at a back edge of each loop within the function if the function is hot using the one or more processors, wherein the OSR triggering code is configured to trigger OSR at a loop depth that is less than the hot count.

12. The system of claim 11, wherein the non-optimizing compiler is further configured to:
determine the loop depth of one or more loops within the unoptimized code; and
insert an identifier in the unoptimized code identifying the loop depth of each of the one or more loops within unoptimized code.

13. The system of claim 11, wherein the non-optimizing compiler is further configured to:
determine the loop depth of one or more loops within unoptimized code; and
create a table that corresponds each of the one or more loops with a corresponding loop depth of each of the one or more loops.

14. The system of claim 11, wherein the OSR triggering code is configured to:
execute an optimizing compiler on the computing device, wherein the optimizing compiler creates optimized code for the function from the unoptimized code and the source code; and
enter the optimized code on the computing device.

15. The system of claim 14, wherein the OSR triggering code is configured to:
execute an optimizing compiler on the computing device, wherein the optimizing compiler creates optimized code for the function from the unoptimized code and the source code; and
enter from a point within the optimized code that corresponds to the back edge of the loop where the OSR triggering code was executed.

16. The system of claim 14, wherein the OSR triggering code is further configured to:
translate the state from the execution of unoptimized code into a state that permits the optimized code to execute correctly.

17. The system of claim 14, wherein the optimizing compiler takes as an input profiling information collected during the execution of the unoptimized code.

18. The system of claim 17, wherein the OSR triggering code is further configured to:
execute the unoptimized code on the computing device, if the profiling information is insufficient to generate optimized code from the optimizing compiler; and
execute the optimized code on the computing device, after the profiling information is sufficient to generate optimized code from the optimizing compiler.

19. The system of claim 11, wherein the unoptimized code is executed in an interpreter.

20. The system of claim 11, wherein the source code comprises scripting language instructions.

21. A non-transitory computer-readable medium storing software comprising instructions executable by one or more computers which, upon such execution, cause the one or more computers to perform operations comprising:

compiling a source code into an unoptimized code on a computing device;
executing the unoptimized code on a computing device;
incrementing a hot count;
determining whether a function within the unoptimized code is hot; and
inserting an on-stack replacement (OSR) triggering code at a back edge of each loop within the function if the function is hot, wherein the OSR triggering code is configured to trigger OSR at a loop depth that is less than the hot count.

22. The non-transitory computer-readable medium of claim 21, the operations further comprising:
determining the loop depth of one or more loops within the unoptimized code; and
inserting an identifier in the unoptimized code identifying the loop depth of each of the one or more loops within unoptimized code.

23. The non-transitory computer-readable medium of claim 21, the operations further comprising:
determining the loop depth of one or more loops within the unoptimized code; and
creating a table that corresponds each of the one or more loops with a corresponding loop depth of each of the one or more loops.

24. The non-transitory computer-readable medium of claim 21, wherein the OSR trigger code is configured to:
execute an optimizing compiler on the computing device, wherein the optimizing compiler creates optimized code for the function from the unoptimized code and the source code; and
enter the optimized code on the computing device.

25. The non-transitory computer-readable medium of claim 24, wherein the OSR trigger code is configured to:
execute an optimizing compiler on the computing device, wherein the optimizing compiler creates optimized code for the function from the unoptimized code and the source code; and
enter from a point within the optimized code that corresponds to the back edge of the loop where the OSR triggering code was executed.

26. The non-transitory computer-readable medium of claim 24, wherein the OSR triggering code is further configured to:
translate the state from the execution of unoptimized code into a state that permits the optimized code to execute correctly.

27. The non-transitory computer-readable medium of claim 24, wherein the optimizing compiler takes as an input profiling information collected during the execution of the unoptimized code.

28. The non-transitory computer-readable medium of claim 27, wherein the OSR triggering code is further configured to:
execute the unoptimized code on the computing device, if the profiling information is insufficient to generate optimized code from the optimizing compiler; and
execute the optimized code on the computing device, after the profiling information is sufficient to generate optimized code from the optimizing compiler.

29. The non-transitory computer-readable medium of claim 21, wherein the unoptimized code is executed in an interpreter.

30. The non-transitory computer-readable medium of claim 21, wherein the source code comprises scripting language instructions.

* * * * *

UNITED STATES PATENT AND TRADEMARK OFFICE
CERTIFICATE OF CORRECTION

| | | |
|---|---|---|
| PATENT NO. | : 8,677,335 B1 | Page 1 of 1 |
| APPLICATION NO. | : 13/312578 | |
| DATED | : March 18, 2014 | |
| INVENTOR(S) | : Millikin et al. | |

It is certified that error appears in the above-identified patent and that said Letters Patent is hereby corrected as shown below:

In the Claims

Column 13, line 7, claim 11, please replace "on-stack replacement OSR)" with --on-stack replacement (OSR)--.

Signed and Sealed this
Twenty-ninth Day of July, 2014

Michelle K. Lee
*Deputy Director of the United States Patent and Trademark Office*